United States Patent [19]
Legg

[11] 3,860,992
[45] Jan. 21, 1975

[54] WHEEL LOCK FOR TRANSPORT CART

[75] Inventor: James R. Legg, Long Beach, Calif.

[73] Assignee: Banner Metals Division of Intercole Automation, Inc., Compton, Calif.

[22] Filed: Feb. 19, 1974

[21] Appl. No.: 443,449

[52] U.S. Cl. .................................................. 16/35
[51] Int. Cl. .......................................... B60b 33/00
[58] Field of Search .................. 16/35 D, 35; 188/1

[56] References Cited
UNITED STATES PATENTS

| | | | |
|---|---|---|---|
| 1,998,236 | 4/1935 | Harold | 16/35 R |
| 2,345,442 | 3/1944 | Winters et al. | 16/35 R |
| 2,484,094 | 10/1949 | Jackson | 16/35 R |
| 2,915,775 | 12/1959 | Skupas | 16/35 R |
| 3,066,764 | 12/1962 | Clinton et al. | 16/35 R |

Primary Examiner—Paul R. Gilliam
Assistant Examiner—Doris L. Troutman
Attorney, Agent, or Firm—Jessup & Beecher; Keith D. Beecher

[57] ABSTRACT

A foot-operated swivel wheel lock assembly is provided for a swivel caster type of transport cart. The wheel lock assembly comprises a strip of material which is affixed to the base of one of the castors, and which extends downwardly from the base adjacent the rim of the caster wheel. A U-shaped cam is rotatably supported adjacent the strip on a pair of radial brackets, and a brake pedal is attached to the bight portion of the U-shaped cam. As the brake pedal is pushed downwardly, the cam is caused to turn to a horizontal position in the radial brackets and force the strip against the periphery of the caster wheel in a braking action. A foot-operated release rod is also provided which contacts a cam reversing rod to release the brake and return the cam to its original position.

2 Claims, 2 Drawing Figures

WHEEL LOCK FOR TRANSPORT CART

BACKGROUND OF THE INVENTION

The foot-operated swivel wheel lock assembly of the invention has particular utility for use in conjunction with mail carrying transport carts. However, it will become evident as the description proceeds that the swivel wheel lock assembly of the invention has general utility in conjunction with a wide variety of carts of the type using swivel casters, and it provides a simple foot-operated means for locking one or more of the wheels of such a cart, and for causing the wheels to remain locked until a subsequent foot-operated brake release rod is actuated.

DETAILED DESCRIPTION OF THE ILLUSTRATED EMBODIMENT

Figure 1:
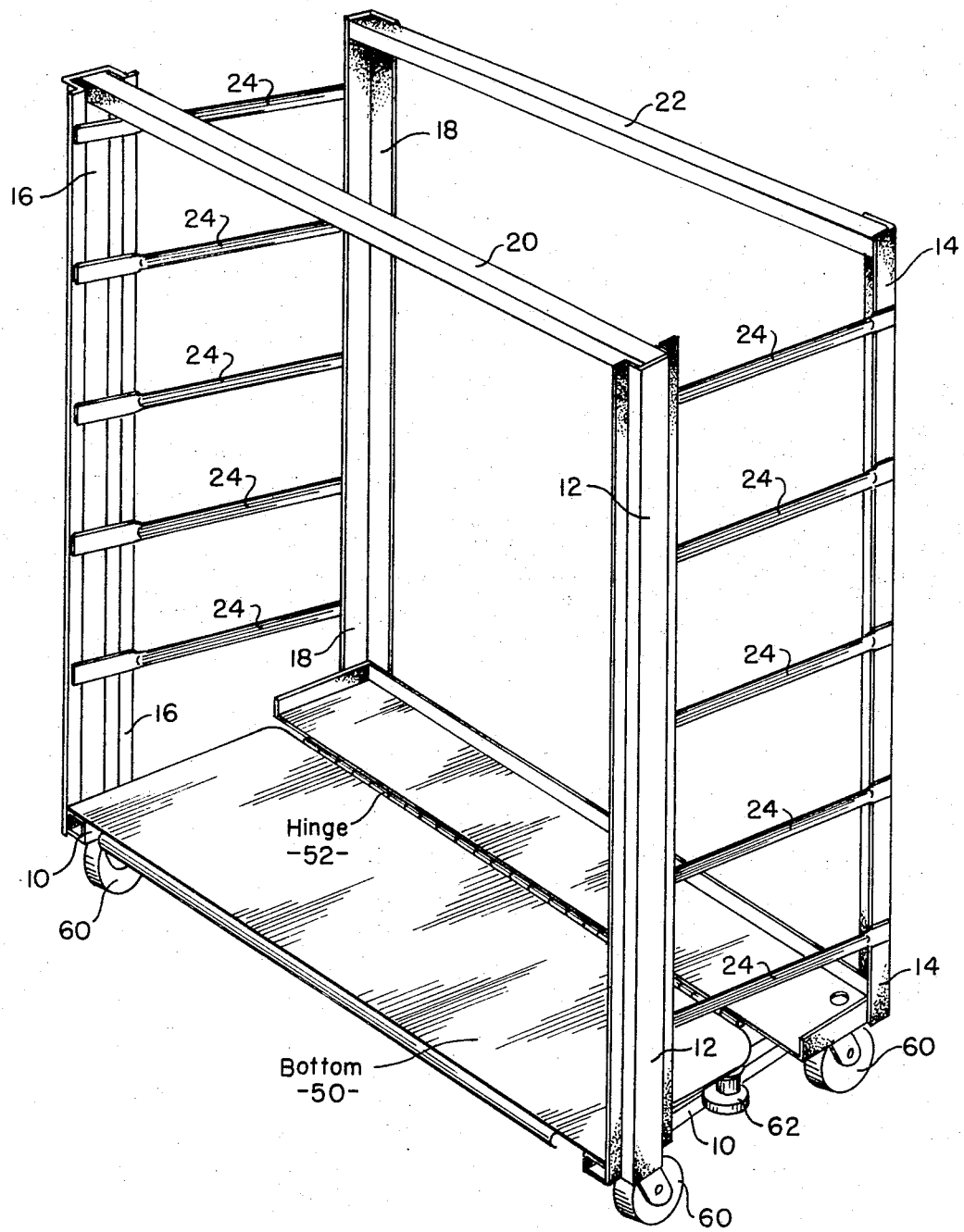
FIG. 1 is a perspective representation of a transport cart which utilizes swivel casters and which may incorporate the improved wheel lock assembly of the invention.

The transport cart shown in FIG. 1 is similar to the cart described in copending application Ser. No. 307,813 which was filed Nov. 20, 1972 in the name of James D. Wilson, and which is assigned to the present assignee.

The particular cart shown in FIG. 1 includes a lower frame member 10 having a U-shaped configuration with side legs diverging outwardly from one side of the cart to the other. Four upright posts 12, 14, 16 and 18 are attached to the lower frame member 10 at the four corners of the cart, and these posts extend upwardly, as shown.

A pair of transverse braces 20 and 22 extend across the upper ends of the posts 12, 16 and 14, 18, respectively, at each side of the cart; and a plurality of spaced and parallel elongated members 24 extend between the posts 12, 14 and 16, 18 at each end of the cart. The elongated members 24 are inclined downwardly from one side of the cart to the other so as to permit the cart to be nested into a similar cart when not in use.

The cart illustrated in FIG. 1 includes a flat bottom member 50 which is supported on the lower frame member 10, and which has one section hinged to another by a hinge 52, so that the one section may be turned up to permit the cart to be nested into similar carts in a manner described in detail in the copending application.

A plurality of swivel casters 60 are suspended from the lower frame 10. A coupling post 62 is also suspended from the lower frame 10 to permit the cart to be coupled to another similar cart.

It should be stressed that the cart shown in FIG. 1 represents but one type of cart on which the swivel brake assembly of the invention may be mounted.

Figure 2:
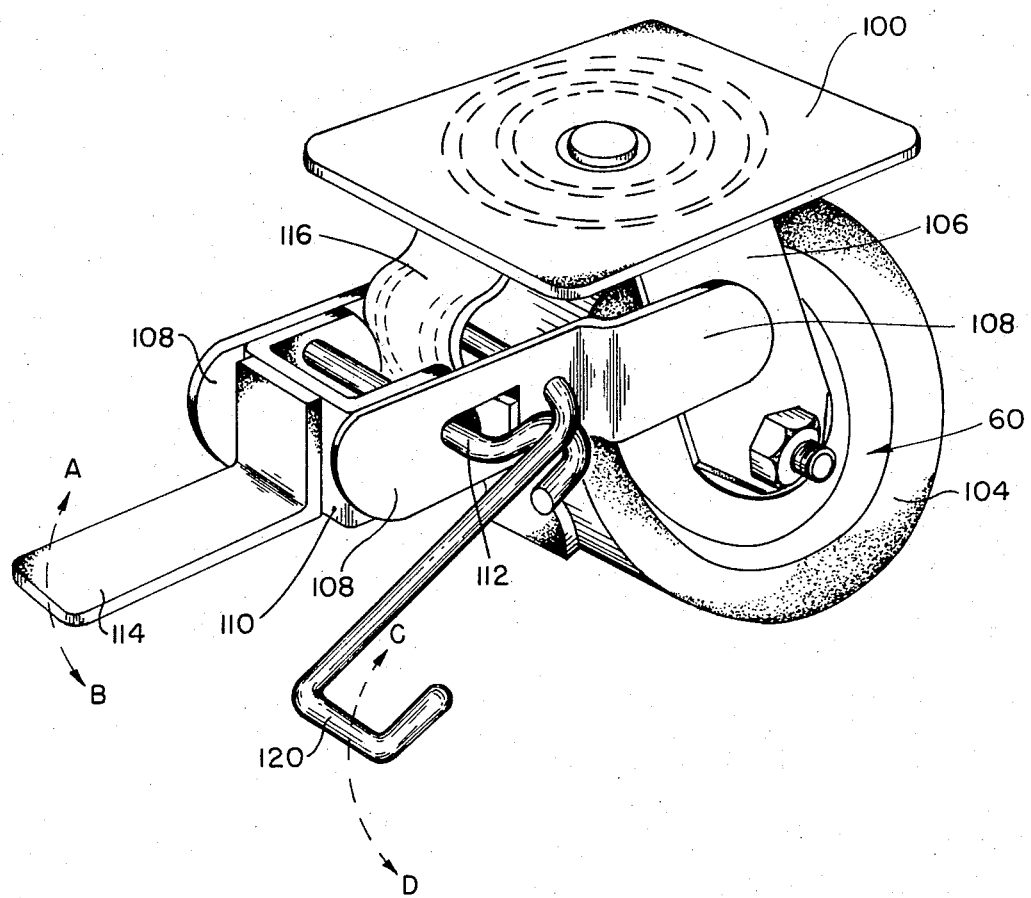
FIG. 2 is a perspective representation of one embodiment of the wheel lock assembly of the invention, as used in conjunction with one of the casters of the cart of FIG. 1.

As shown in FIG. 2, each of the casters 60 is attached to a horizontal swivel base plate 100 which rotates with the caster about a vertical swivel axis. The wheel lock assembly of the invention is mounted on one or more of the casters, and it may take the form shown in FIG. 2.

The caster assembly illustrated in FIG. 2 includes a caster wheel 104 which is rotatably mounted in a bracket 106, the bracket being affixed to the underside of the swivel plate 100. The wheel lock assembly includes a pair of spaced and parallel radial bracket arms 108, which are attached to the bracket 106, and which extend generally horizontally from the bracket 106. A U-shaped cam 110 is keyed to a transverse reversing rod 112 which extends through slots in the radial bracket arms 108. The reversing rod 112 has a U-shaped end portion. An L-shaped bracket 114 is welded, or otherwise attached to the cam 110 to constitute a brake pedal for the assembly.

A strip of material is attached to the underside of the swivel plate 100 adjacent the rim of the wheel 104 to constitute a brake 116. A release rod 120 is also pivotally mounted in the radial bracket arms 108. The release rod engages the U-shaped end portion of the reversing rod 112. The release rod 120 has a bent-over portion at its free end.

When the brake pedal 114 is pushed downwardly, the cam 110 is turned in the bracket arms 108 from an inclined position to the illustrated generally horizontal position, so as to force the brake 116 against the periphery of the wheel 104, and thereby to hold the wheel in a locked position. This action turns the reversing rod 112 in a counterclockwise direction to the illustrated position, with its U-shaped end section engaging the release rod 120.

It is evident that once the brake pedal 114 is pushed down to its illustrated position of FIG. 2, so as to lock the caster wheel 104, the wheel will remain locked after the operator's foot has been removed from the pedal. In order to release the lock, the bent-over free end of the release rod 120 is pushed down by the operator's foot, and this serves to turn the reversing rod 112 in a clockwise direction, thereby to turn the cam 110 to its inclined position so as to release the brake 116.

The invention provides, therefore, a simple, yet effective, lock assembly, for locking the wheels of swivel type carts, this being achieved by a simple foot pedal action; and for providing for the subsequent release of the wheels by means of a simple foot-operated release rod.

While a particular embodiment of the invention has been shown and described, modifications may be made. It is intended in the claims to cover the modifications that come within the spirit and scope of the invention.

What is claimed:

1. In a swivel caster assembly which includes a horizontal swivel plate mounted for rotation about a vertical axis, a pair of spaced-apart bracket arms mounted on the underside of the plate and extending down from the plane of the plate, and a wheel rotatably mounted between said spaced-apart bracket arms; a wheel lock assembly comprising: a pair of spaced-apart radial bracket arms affixed to said first-named bracket arms and extending generally radially with respect to the wheel; a braking strip mounted on said swivel plate and extending down between said radial bracket arms adjacent the peripheral rim of said wheel; a transverse reversing rod extending between said radial bracket arms adjacent to said braking strip; a cam member keyed to said reversing rod and rotatable thereby between a braking position in which it forces the braking strip against the peripheral rim of the wheel, and a release position in which it enables the braking strip to disengage from the peripheral rim of the wheel; and a foot operated brake pedal attached to said cam member and extending outwardly beyond the ends of said radial bracket arms.

2. The assembly defined in claim 1, in which said reversing rod has a U-shaped end portion, and which includes a brake release rod rotatably mounted in said radial bracket arms and engaging said U-shaped end portion of said reversing rod.

* * * * *